(12) United States Patent
Wang

(10) Patent No.: US 10,714,043 B2
(45) Date of Patent: Jul. 14, 2020

(54) DISPLAY DEVICE AND LIQUID CRYSTAL DISPLAY

(71) Applicants: Chongqing HKC Optoelectronics Technology Co., Ltd., Chongqing (CN); HKC Corporation Limited, Shenzhen, Guangdong (CN)

(72) Inventor: Mingliang Wang, Chongqing (CN)

(73) Assignees: Chongqing HKC Optoelectronics Technology Co., Ltd., Chongqing (CN); HKC Corporation Limited, Shenzhen (CN)

(*) Notice: Subject to any disclaimer, the term of this patent is extended or adjusted under 35 U.S.C. 154(b) by 0 days.

(21) Appl. No.: 16/251,064

(22) Filed: Jan. 17, 2019

(65) Prior Publication Data
US 2020/0090612 A1    Mar. 19, 2020

Related U.S. Application Data

(63) Continuation of application No. PCT/CN2018/111336, filed on Oct. 23, 2018.

(30) Foreign Application Priority Data

Sep. 19, 2018  (CN) .......................... 2018 1 1097011

(51) Int. Cl.
*G09G 3/36* (2006.01)
*G02F 1/1362* (2006.01)

(52) U.S. Cl.
CPC ..... *G09G 3/3677* (2013.01); *G02F 1/136286* (2013.01); *G09G 3/3607* (2013.01); *G09G 3/3688* (2013.01); *G02F 2201/123* (2013.01); *G09G 2300/0408* (2013.01); *G09G 2300/0426* (2013.01); *G09G 2300/0452* (2013.01); *G09G 2320/0233* (2013.01)

(58) Field of Classification Search
USPC .................. 345/215, 60–63, 87–99, 690–694
See application file for complete search history.

(56) References Cited

U.S. PATENT DOCUMENTS

| 2004/0145548 A1* | 7/2004 | Miller, IV | G09G 3/3629 345/87 |
| 2010/0265422 A1 | 10/2010 | Chen et al. | |
| 2015/0022560 A1* | 1/2015 | Fu | G09G 3/3614 345/690 |
| 2018/0356662 A1* | 12/2018 | Hao | G02F 1/136213 |

(Continued)

FOREIGN PATENT DOCUMENTS

| CN | 102265329 A | 11/2011 |
| CN | 104298041 A | 1/2015 |
| CN | 104361872 A | 2/2015 |

(Continued)

*Primary Examiner* — Tony O Davis

(57) ABSTRACT

The present application discloses a display device and a liquid crystal display, wherein the display device has a plurality of pixels, and the plurality of pixels are distributed at intervals along an array of a plurality of rows and columns; the pixel distributed at intervals along a plurality of rows includes a plurality of pixels distributed at intervals on odd rows and a plurality of pixels distributed at intervals on even rows; the brightness of the pixels on the odd rows is disposed differentially from the brightness of the pixels on the even rows.

13 Claims, 3 Drawing Sheets

(56) References Cited

U.S. PATENT DOCUMENTS

2019/0094600 A1* 3/2019 Cho .................. G02F 1/133606

FOREIGN PATENT DOCUMENTS

| CN | 104375346 A | 2/2015 |
| CN | 105093602 A | 11/2015 |
| CN | 106297687 A | 1/2017 |
| CN | 106773395 A | 5/2017 |

* cited by examiner

DISPLAY DEVICE AND LIQUID CRYSTAL DISPLAY

CROSS REFERENCE TO RELATED APPLICATIONS

The present application is a Continuation Application of PCT Application No. PCT/CN2018/111336 filed on Oct. 23, 2018, which claims the benefit of Chinese Patent Application No. 201811097011.0, filed on Sep. 19, 2018, which is incorporated herein by reference in its entirety.

FIELD OF THE DISCLOSURE

The present application relates to the field of display, and in particular, to a display device and a liquid crystal display.

BACKGROUND OF THE DISCLOSURE

The driving circuit system of the liquid crystal display comprises: a scan driving integrated circuit, also known as a gate driver integrated circuit (G-IC); and a data driving integrated circuit, also known as a source driver IC (Source Driver IC, S-IC).

The liquid crystal display is driven by progressive scanning, that is, the rows are sequentially turned on, and each time a row is turned on, all the column data signal lines transmit data to the row of pixels. The pixel driving structure can be divided into 1G1D and 2G2D according to the number of row openings and the input of corresponding pixel signals at a certain time.

The 1G1D structure is a conventional driving method for pixels, that is, only one row is turned on at a time, and all columns transmit data signals to the pixels of the row. According to the arrangement of the TFTs in the pixel, the 1G1D structure is further divided into a Column-Inversion 1G1D structure and a Z-Inversion 1G1D structure, and the data signal line therein is doubled compared to the conventional 1G1D, 2G2D structure. 2G2D means to open two rows at a time; the data signal of the odd column is input into the corresponding pixel of the previous row, and the data signal of the even column is input into the corresponding pixel of the next row. For the pixel driving structure of 2G2D, in the case where the total number of rows is unchanged, it is equivalent to increasing the data writing time (Writing Time) of each row, thereby facilitating the improvement or securing of the pixel charging rate.

It should be particularly noted that in the VA mode, in order to expand the viewing angle characteristics, each sub-pixel contains a plurality of domains (usually having eight domains, and domains refer to liquid crystal regions of different orientations). Compared to the conventional 1G1D pixel driving enclosure, the VA mode is implemented by adding scan lines or data lines in order to achieve multi-domain. A special pixel driving structure is sometimes used to reduce the data line and increase the scan line. This special pixel driving structure is a dual-gate pixel driving structure (Dual-gate). In the dual-gate pixel driving structure, the row scan line is doubled and the data line is reduced by half.

Since the liquid crystal is controlled by the directional light valve, it is relatively easy to cause a color cast at large viewing angle, that is, when viewed at a relatively oblique angle, a color cast phenomenon may occur. As shown in FIG. 1, any adjacent two pixels of the exemplary display device have the same brightness. At present, there are two ways to improve this phenomenon: one is to divide the original pixel (pixel) into main pixel and sub pixel in the pixel design of the liquid crystal panel, and dim the brightness of the sub pixel, but this will cause the transmittance of the panel to reduce significantly; another is to use a special mathematical algorithm inside the timing processing chip to design bright and dark data for adjacent pixels, and although this has little effect on the transmittance of the liquid crystal panel, the algorithm is complicated, the debugging and maintenance are not easy, and the cost of the timing processing chip is increased.

SUMMARY OF THE DISCLOSURE

The main purpose of the present application is to propose a display device aimed at improving the color cast problem of the display device.

To achieve above purpose, the display device proposed by the present application has a plurality of pixels, and the plurality of pixels are distributed at intervals along an array of a plurality of rows and columns; the pixel of a plurality of rows includes a plurality of pixels distributed at intervals on odd rows and a plurality of pixels distributed at intervals on even rows; the brightness of the pixels on the odd rows is disposed differentially from the brightness of the pixels on the even rows.

Optionally, the pixels on the Nth of the odd rows and the pixels on the N+2th of the odd rows are alternately distributed, and/or the pixels on the N+1th of the even rows and the pixels on the N+3th of the even rows are alternately distributed, the N being an integer greater than zero.

Optionally, the pixels on the Nth of the odd rows and the pixels on the N+1 th of the even rows are alternately distributed on the columns, and the pixels on the Nth of the odd rows and the pixels on the N+1th of the even rows are on the same row.

Optionally, the spacing of any two adjacent rows of pixels is disposed equally; and/or the spacing of any two adjacent columns of pixels is disposed equally.

Optionally, the display device comprises a back substrate and a front substrate that are opposite and spaced apart, and a liquid crystal layer disposed between the back substrate and the front substrate; the back substrate is provided with a plurality of scan lines and a plurality of data lines spanning and crossing the plurality of scan lines, a plurality of pixel electrodes are connected to the plurality of scan lines and the plurality of data lines, and a plurality of the pixel electrodes are disposed in one-to-one correspondence with the plurality of pixels.

Optionally, the plurality of scan lines include a plurality of scan lines of odd rows and a plurality of scan lines of even rows; the scan lines of odd rows are connected to a first output enable signal, and the scan lines of even rows are connected to a second output enable signal; the effective time of the second output enable signal is disposed differentially from the effective time of the first output enable signal, so that the brightness of the pixels on the scan lines of odd rows is disposed differentially from the brightness of the pixels on the scan lines of even rows.

Optionally, the ratio of the effective time of the first output enable signal to the effective time of the second output enable signal ranges from 1:1.5 to 1:2.

Optionally, the back substrate is provided with a plurality of thin film transistors and a plurality of pixel capacitors, and the electrodes of the pixel capacitors form the pixel electrodes; each of the plurality of thin film transistors has a gate connected to the scan line; a source connected to the data line; and a drain connected to the pixel electrode.

Optionally, the pixel includes a red pixel, a green pixel, and a blue pixel; the pixel capacitor includes a first pixel capacitor corresponding to the red pixel, a second pixel capacitor corresponding to the green pixel, and a third pixel capacitor corresponding to the blue pixel.

Optionally, the pixel further includes a yellow pixel, and the pixel capacitor further includes a fourth pixel capacitor corresponding to the yellow pixel.

The present application further provides a liquid crystal display, wherein the liquid crystal display has a plurality of pixels, and the plurality of pixels are distributed at intervals along an array of a plurality of rows and columns; the pixel of a plurality of rows includes a plurality of pixels distributed at intervals on odd rows and a plurality of pixels distributed at intervals on even rows; the brightness of the pixels on the odd rows is disposed differentially from the brightness of the pixels on the even rows.

In the display device proposed by the present application, since the brightness of the pixels on the odd rows is disposed differentially from the brightness of the pixels on the even rows, that is, the brightness of the pixels on the odd rows is greater or smaller than the brightness of the pixels on the even rows, the light emitted by the high-brightness pixel may be mixed with the light emitted by the low-brightness pixel, thereby achieving a better visual compensation effect, further enabling the brightness of the display device to be uniform and avoiding the problem of color cast of the display device at different viewing angles. More importantly, the display device proposed by the present application may not divide one pixel into a main pixel and a sub-pixel, and thus may not reduce the transmittance of the display device. In addition, the display device provided by the present application may not improve the mathematical algorithm inside the timing processing chip, so the solution of the present application is simple and easy to operate, and has high operability, and may not increase the cost of the timing processing chip while better improving the color cast at large viewing angle, therefore, the solution is extremely competitive in terms of cost.

BRIEF DESCRIPTION OF THE DRAWINGS

In order to illustrate the technical schemes in the embodiments of the present application or in the exemplary art more clearly, the drawings which are required to be used in the description of the embodiments or the exemplary art are briefly described below. It is obvious that the drawings described below are only some embodiments of the present application. It is apparent to those of ordinary skill in the art that other drawings may be obtained based on the structures shown in accompanying drawings without inventive effort.

Figure 1:
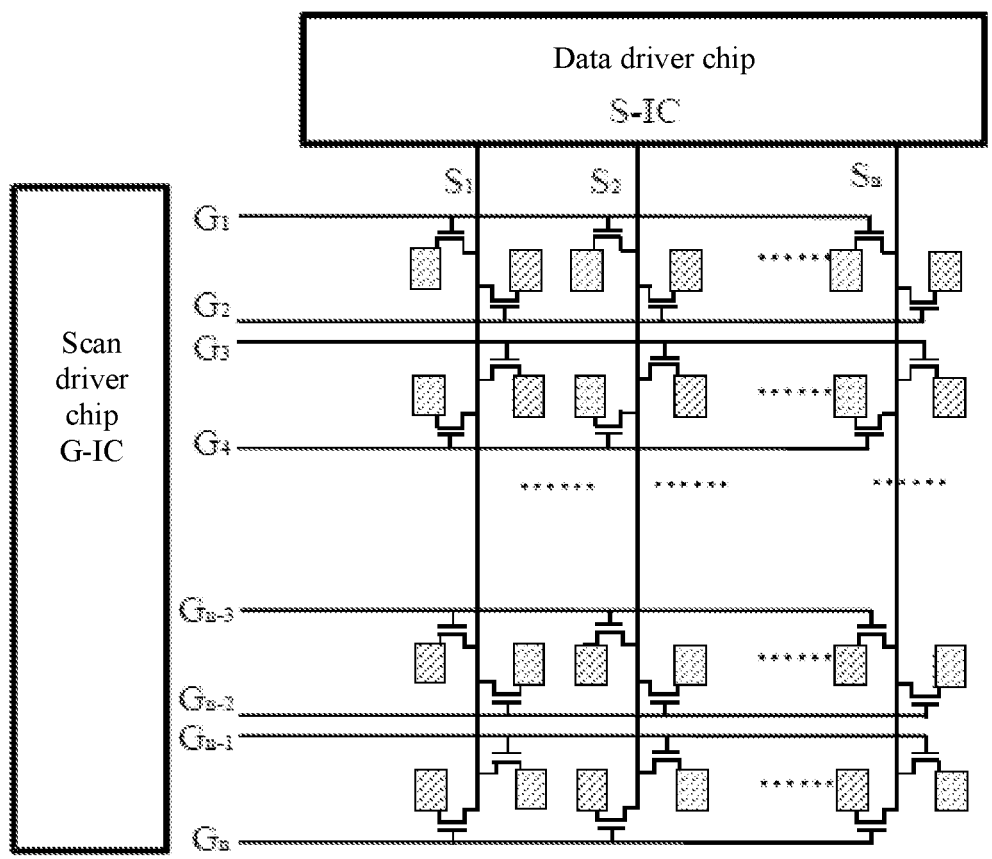
FIG. 1 is a structural view of the driving architecture of a display device in an exemplary art.

With reference to the drawings, the implement of the object, features and advantages of the present application will be further illustrated in conjunction with embodiments.

DETAILED DESCRIPTION OF THE EMBODIMENTS

The technical solutions in the embodiments of the present application will be clearly and completely described hereafter in connection with the drawings in embodiments of the present application. It is apparent that the described embodiments are only a part of the embodiments of the present application, but not the whole. Based on the embodiments of the present application, all the other embodiments obtained by those of ordinary skill in the art without inventive effort are within the scope of the present application.

It should be noted that, if there is a directional indication (such as up, down, left, right, front, back, . . . ) in the embodiments of the present application, the directional indication is only used to explain the relative positional relationship, the motion situation, etc. between the components in a certain posture (as shown in the drawings), and if the certain posture changes, the directional indication also changes accordingly.

In addition, if there is a description related to "first", "second", etc. in the embodiments of the present application, the description of the "first", "second", etc. is used for the purpose of description only, and is not to be construed as indicating or implying its relative importance or implicitly indicating the number of technical features indicated. Thus, features defined by "first" or "second" may include at least one of the features, either explicitly or implicitly. In addition, the technical solutions between the various embodiments may be combined with each other, but must be based on what can be implemented by those skilled in the art. When the combination of technical solutions is contradictory or impossible to achieve, it should be considered that the combination of such technical solutions does not exist and is not within the scope of protection claimed in the present application.

The present application provides a display device capable of improving uniformity of display brightness and avoiding occurrence of color cast.

Figure 2:
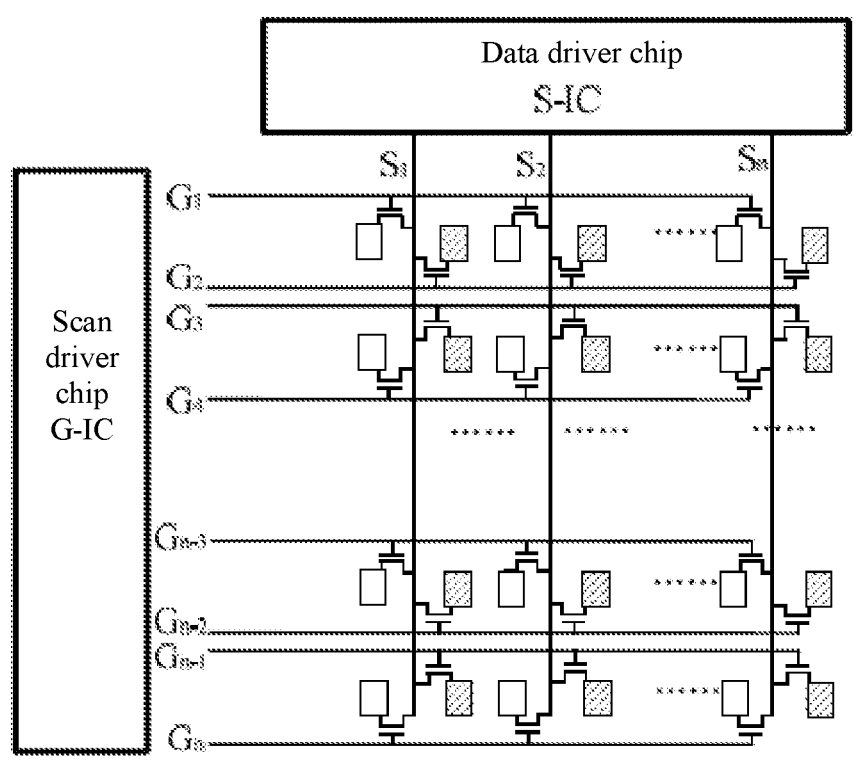
FIG. 2 is a structural view of driving architecture of a display device in the present application.

In an embodiment of the present application, as shown in FIG. 2, the display device has a plurality of pixels, and the plurality of pixels are distributed at intervals along an array of a plurality of rows and columns; the pixel distributed at intervals along a plurality of rows includes a plurality of pixels distributed at intervals on odd rows and a plurality of pixels distributed at intervals on even rows; the brightness of the pixels on the odd rows is disposed differentially from the brightness of the pixels on the even rows.

In the display device proposed by the present application, since the brightness of the pixels on the odd rows is disposed differentially from the brightness of the pixels on the even rows, that is, the brightness of the pixels on the odd rows is greater or smaller than the brightness of the pixels on the even rows or the brightness of pixels on odd rows is smaller than the brightness of pixels on even rows, the light emitted by the high-brightness pixel may be mixed with the light emitted by the low-brightness pixel, thereby achieving a better visual compensation effect, further enabling the brightness of the display device to be uniform and avoiding the problem of color cast of the display device at different viewing angles.

More importantly, the present application may not divide one pixel into a main pixel and a sub-pixel, and thus may not reduce the transmittance of the display device. In addition, the solution of the present application may not improve the mathematical algorithm inside the timing processing chip, so the solution of the present application is simple and easy to operate, and has high operability, and may not increase the cost of the timing processing chip while better improving the color cast at large viewing angle, therefore, the solution is extremely competitive in terms of cost.

It should be noted that the concepts of the rows and columns are relative. In the present embodiment, the rows are horizontally extended and the columns are longitudinally extended. In other embodiments, the rows are longitudinally extended and the columns are horizontally extended. Thus, the meaning that the brightness of the pixels on the odd rows is disposed differentially from the brightness of the pixels on the even rows is not limited to the case in the embodiment, but includes that the brightness of the pixels on the odd rows is disposed differentially from the brightness of the pixels on the even rows on the vertically extending rows. However, the rows and columns mentioned later are subject to the usual understanding (i.e., the rows are horizontally extended and the columns are longitudinally extended).

In other words, one of the design concepts of the present application is to make the brightness of adjacent two pixels dispose differentially. Therefore, whether the brightness of the adjacent two rows of pixels is disposed differentially, or the brightness of the adjacent two columns of pixels are disposed differentially, these should fall within the protection scope of the present application.

Further, referring still to FIG. 2, in order to further improve the uniformity of the display effect of the display device, in an embodiment of the present application, the pixels on the Nth of the odd rows and the pixels on the N+2th of the odd rows are alternately distributed, and/or the pixels on the N+1 th of the even rows and the pixels on the N+3th of the even rows are alternately distributed, the N being an integer greater than zero.

Specifically, taking the case that odd rows are in high brightness and even rows are in low brightness as an example, the odd rows include a first row G1 and a third row G3, and the even rows include a second row G2 and a fourth row G4. Since in the present embodiment the brightness of the pixels of the first row G1 and the third row G3 are higher than the brightness of the pixels of the second row G2 and the fourth row G4, the brightness of the display device enables primary mixing. More importantly, since the pixels on the first row G1 and the pixels on the third row G3 are distributed alternatively, and the pixels on the second row G2 and the pixels on the fourth row G4 are distributed alternatively, the strong light and the weak light may be further mixed to further improve the uniformity of the display effect of the display device.

The solution of the present application is a routing design for new dual-gate pixel driving structure. The odd rows of the exemplary dual-gate pixel driving structure connect pixels at the same position. Taking the column S1 as an example, the positions of the pixels connected to the first row G1 and the third row G3 are located at the leftmost side. However, the present solution has improved this connection method, specifically, the routing connection of the third row G3 and the fourth row G4 is exactly opposite to the first row G1 and the second row G2, that is, the positions of the pixels connected to the first row G1 and the third row G3 are exactly crossed and staggered. Taking the first column S1 as an example, the first row G1 is connected to the pixel on the left side of the first column S1, and the third row G3 is connected to the pixel on the right side of the first column S1. In this way, the positions of the pixels controlled by the odd rows may be distributed alternatively. Similarly, the case for even rows is the same, and will not be described here.

However, the design of the present application is not limited thereto. In other embodiments, the pixels on the first row G1 and the pixels on the third row G3 are distributed alternatively, or the pixels on the second row G2 and the pixels on the fourth row G4 are distributed alternatively. In this way, the color cast of the display device may also be improved to some extent.

It should be noted that, in the Nth of the odd rows, N is an integer starting from 1, e.g., N is 1, 3, 5, 7, etc.; correspondingly, in the N+1th of the even rows, the N+1th is 2, 4, 6, 8, etc.

Further, referring still to FIG. 2, the pixels on the Nth of the odd rows and the pixels on the N+1th of the even rows are alternately distributed on the columns, and the pixels on the Nth of the odd rows and the pixels on the N+1 th of the even rows are on the same row. Since the pixel on the Nth of the odd rows is on the same row as the pixel on the N+1th of the even rows, the pixels of the strong light and the pixels of the weak light may be distributively alternatively in a horizontal position, thereby improving the uniformity of the display effect of the display device.

It should be noted here that the row in the Nth of the odd "rows" refers to the row formed by the scan lines such as G1 and G3; the row where the pixel on the Nth of the odd rows is on the same "row" as the pixel on the N+1 th of the even rows refers to the position of the pixel on the display device.

Preferably, in an embodiment of the present application, the spacing of any two adjacent rows of pixels is disposed equally, and/or the spacing of any two adjacent columns of pixels is disposed equally. In this way, the display effect of the display screen may be made uniform, thereby improving the color cast. In the present embodiment, the "row" refers to the position of the pixel on the display device.

Specifically, in the present embodiment, the spacing of pixels in any two adjacent rows is disposed equally. Preferably, the spacing of two adjacent rows of pixels is approximately equal to the spacing of pixels of two adjacent columns. In this way, the display brightness of the display device may be made uniform, thereby significantly improving the color cast.

Further, as shown in FIG. 2, the basic structure of the display device of the present application will now be described in detail. In an embodiment of the present application, the display device comprises a back substrate and a front substrate that are opposite and spaced apart, and a liquid crystal layer disposed between the back substrate and the front substrate;

the back substrate is provided with a plurality of scan lines (G1, G2 . . . Gn) and a plurality of data lines (S1, S2 . . . Sn) spanning and crossing the plurality of scan lines, a plurality of pixel electrodes are connected to the plurality of scan lines and the plurality of data lines, and a plurality of the pixel electrodes are disposed in one-to-one correspondence with the plurality of pixels.

Specifically, the scan line is connected to a G-IC (Gate Driver Integrated Circuit), and the data line is connected to an S-IC (Source Driver IC).

Figure 3:
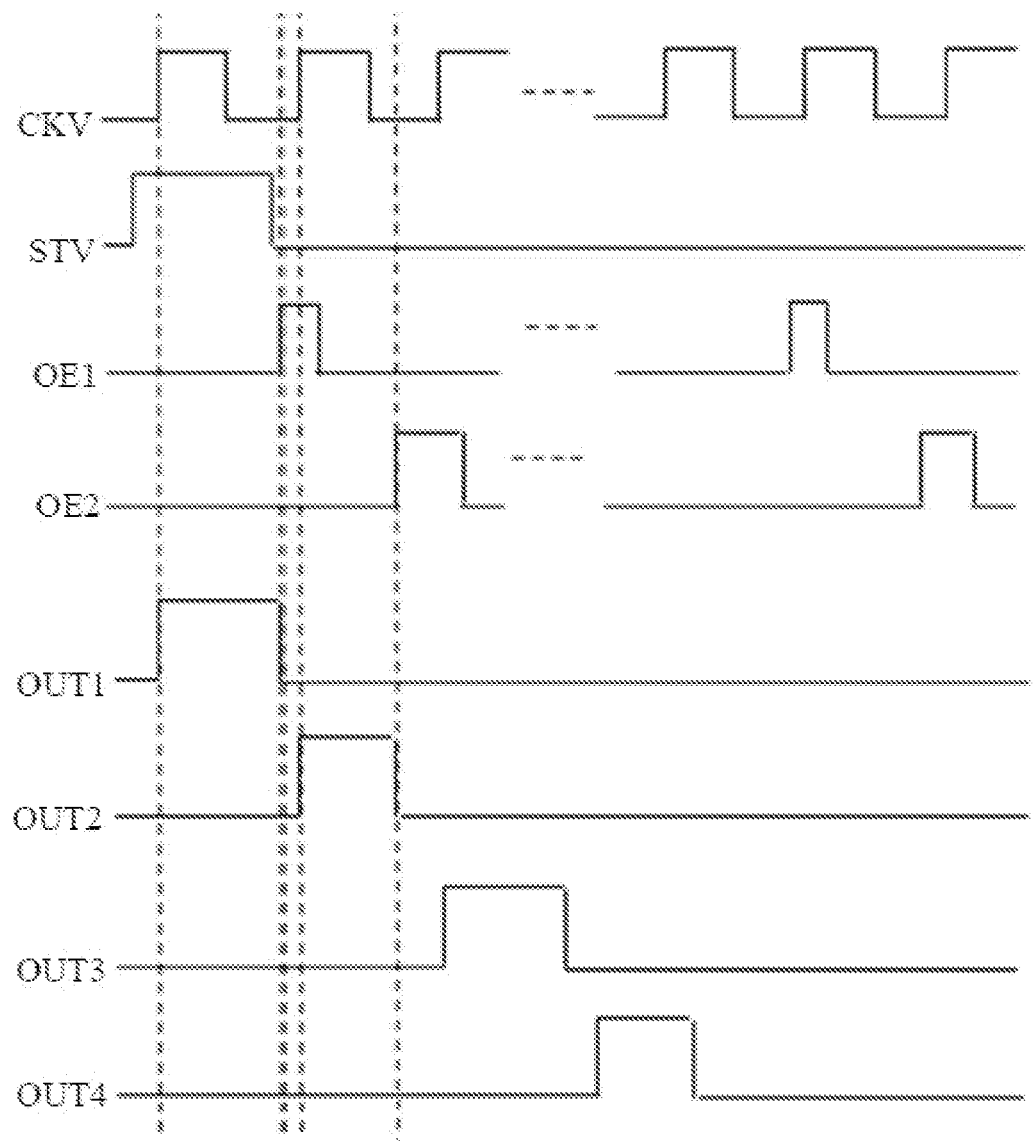
FIG. 3 is a timing view of input and output signal of driving architecture of a display device in the present application.

Further, referring to FIGS. 2 and 3, the principle of disposing the brightness of the pixels on the odd rows to be differentially from the brightness of the pixels on the even rows in the present application will now be described in detail. In the present application, the plurality of scan lines include a plurality of scan lines of odd rows (G1, G3 . . . Gn) and a plurality of scan lines of even rows (G2, G4 . . . Gn+1); the scan lines of odd rows are connected to a first output enable signal OE1, and the scan lines of even rows are connected to a second output enable signal OE2; the effective time of the second output enable signal OE2 is disposed differentially from the effective time of the first output enable signal OE1, so that the brightness of the pixels on the scan lines of odd rows is disposed differentially from the brightness of the pixels on the scan lines of even rows.

Specifically, the first output enable signal OE1 controls the output of the odd rows, and the second output enable signal OE2 controls the output of the even rows. In the present application, the effective time of the second output enable signal OE2 is greater than the effective time of the first output enable signal OE1. In this way, the switching waveform opening time of scan lines of even rows is smaller than the switching waveform opening time of the scan lines of odd rows, further enabling the data writing duration of the pixels on the scan lines of odd rows to be greater than the data writing duration of the pixels on the scan lines of even rows. Thus, the brightness of the pixels on the scan lines of odd rows is caused to be higher than the brightness of the pixels on the scan lines of even rows.

Similarly, if the effective time of the second output enable signal OE2 is less than the effective time of the first output enable signal OE1, the brightness of the pixels on the scan lines of even rows is caused to be higher than the brightness of the pixels on the scan lines of odd rows.

It should be noted that the first output enable signal OE1 is used to avoid mutual interference between row scanning; when the first output enable signal OE1 is at a high level, the scan signals of all the rows are at a low level. The second output enable signal OE2 is disposed such that the scan signals of the rows have an MLG function (multi-step gate drive function), the second output enable signal OE2 is effective at the high level. When the second output enable signal OE2 is at a high level, the high level of the corresponding scan signal of row is pulled down to a slightly lower level. Thus, the MLG function may be implemented to reduce the influence of the feed voltage, thereby improving the display properties of the panel.

As shown in FIG. 2, CKV represents clock signal, STV represents frame scan start signal, and OUT1, OUT2, OUT3, and OUT4 represent the scan signal on the first row G1, the scan signal on the second row G2, the scan signal on the third row G3, and the scan signal on the fourth row G4, respectively. As can be seen from FIG. 2, the effective time of the second output enable signal OE2 is greater than the effective time of the first output enable signal OE1, the first output enable signal OE1 controls the output of the odd rows, and the second output enable signal OE2 controls the output of the even rows. Therefore, the opening time of the output waveform of even rows is smaller than the opening time of the output waveform of odd rows (specifically, taking OUT1 and OUT2 as an example, OUT1 represents the opening time of the output waveform of the first row, and OUT2 represents the opening time of the output waveform of the second row, OUT1 means high level is effective and OUT2 means high level is effective). Thus, the charging effect for odd rows is better, so that the brightness of the pixels on the scan lines of odd rows may be caused to be higher than the brightness of the pixels on the scan lines of even rows.

Further, in the present application, the ratio of the effective time of the first output enable signal OE1 to the effective time of the second output enable signal OE2 ranges from 1:1.5 to 1:2. The effective time of the output enable signal is inversely proportional to the data writing duration of the pixel, and the data writing duration of the pixel is proportional to the brightness of the pixel. Thus, the effective time of the output enable signal is inversely proportional to the brightness of the pixel. Therefore, in the present application, the effective time of the first output enable signal OE1 is less than the effective time of the second output enable signal OE2, and the brightness of the pixels on the scan lines of odd rows is higher than the brightness of the pixels on the scan lines of even rows.

Further, as shown in FIG. 2, the structure of the back substrate will now be described. The back substrate is provided with a plurality of thin film transistors and a plurality of pixel capacitors, and the electrodes of the pixel capacitors form the pixel electrodes; each of the plurality of thin film transistors has a gate connected to the scan line; a source connected to the data line; and a drain connected to the pixel electrode.

Specifically, in the present embodiment, the pixel includes a red pixel, a green pixel, and a blue pixel; the pixel capacitor includes a first pixel capacitor corresponding to the red pixel, a second pixel capacitor corresponding to the green pixel, and a third pixel capacitor corresponding to the blue pixel.

Preferably, in an embodiment of the present application, in order to increase the color gamut of the display device, the pixel further includes a yellow pixel, and the pixel capacitor further includes a fourth pixel capacitor corresponding to the yellow pixel. Specifically, the display device proposed in the present embodiment is a four-primary color display, that is, the pixels are arranged in an arrangement of RGBY (red, green, blue and yellow). In this way, the resolution, transmittance, and color gamut of the display device may be improved. However, the design of the present application is not limited thereto. In other embodiments, the four primary colors display may also be in four primary colors of RGBW (red, green, blue and white), that is, the pixels include red pixels, green pixels, blue pixels, and white pixels. The pixel capacitor further includes a fifth pixel capacitor corresponding to the white pixel. In this way, the color gamut, resolution, and transmittance of the display device may also be improved.

The present application further provides a liquid crystal display, wherein the liquid crystal display has a plurality of pixels, and the plurality of pixels are distributed at intervals along an array of a plurality of rows and columns; the pixel of a plurality of rows includes a plurality of pixels distributed at intervals on odd rows and a plurality of pixels distributed at intervals on even rows; the brightness of the pixels on the odd rows is disposed differentially from the brightness of the pixels on the even rows. It should be noted here that the liquid crystal display is a subordinate concept of the display device. In addition to the liquid crystal display, the display device includes an OLED display (organic electro luminescence diode display) and the like.

The above mentioned is only the preferred embodiment of the present application, which does not limit the patent scope of the present application, and any equivalent structure or process made under the concepts of the present application by using the specification and the drawings of the present application or direct or indirect applications in other related technical fields should be contained in the scope of patent protection in a similar way.

What is claimed is:

1. A display device, wherein the display device has a plurality of pixels, and the plurality of pixels are distributed at intervals along an array of a plurality of rows and columns; the pixel of a plurality of rows includes a plurality of pixels distributed at intervals on odd rows and a plurality of pixels distributed at intervals on even rows; the brightness of the pixels on the odd rows is disposed differentially from the brightness of the pixels on the even rows, wherein the pixels on the Nth of the odd rows and the pixels on the N+2th of the odd rows are alternately distributed, or—the pixels on the N±1th of the even rows and the pixels on the N+3th of the even rows are alternately distributed, the N being an integer greater than zero.

2. The display device according to claim 1, wherein the pixels on the Nth of the odd rows and the pixels on the N+1th of the even rows are alternately distributed on the columns, and the pixels on the Nth of the odd rows and the pixels on the N+1th of the even rows are on the same row.

3. The display device according to claim 2, wherein the spacing of any two adjacent rows of pixels is disposed equally; and/or the spacing of any two adjacent columns of pixels is disposed equally.

4. The display device according to claim 2, wherein the display device comprises a back substrate and a front substrate that are opposite and spaced apart, and a liquid crystal layer disposed between the back substrate and the front substrate;
the back substrate is provided with a plurality of scan lines and a plurality of data lines spanning and crossing the plurality of scan lines, a plurality of pixel electrodes are connected to the plurality of scan lines and the plurality of data lines, and a plurality of the pixel electrodes are disposed in one-to-one correspondence with the plurality of pixels.

5. The display device according to claim 3, wherein the display device comprises a back substrate and a front substrate that are opposite and spaced apart, and a liquid crystal layer disposed between the back substrate and the front substrate;
the back substrate is provided with a plurality of scan lines and a plurality of data lines spanning and crossing the plurality of scan lines, a plurality of pixel electrodes are connected to the plurality of scan lines and the plurality of data lines, and a plurality of the pixel electrodes are disposed in one-to-one correspondence with the plurality of pixels.

6. The display device according to claim 1, wherein the display device comprises a back substrate and a front substrate that are opposite and spaced apart, and a liquid crystal layer disposed between the back substrate and the front substrate;
the back substrate is provided with a plurality of scan lines and a plurality of data lines spanning and crossing the plurality of scan lines, a plurality of pixel electrodes are connected to the plurality of scan lines and the plurality of data lines, and a plurality of the pixel electrodes are disposed in one-to-one correspondence with the plurality of pixels.

7. The display device according to claim 6, wherein the plurality of scan lines include a plurality of scan lines of odd rows and a plurality of scan lines of even rows; the scan lines of odd rows are connected to a first output enable signal, and the scan lines of even rows are connected to a second output enable signal; the effective time of the second output enable signal is disposed differentially from the effective time of the first output enable signal, so that the brightness of the pixels on the scan lines of odd rows is disposed differentially from the brightness of the pixels on the scan lines of even rows.

8. The display device according to claim 7, wherein the ratio of the effective time of the first output enable signal to the effective time of the second output enable signal ranges from 1:1.5 to 1:2.

9. The display device according to claim 6, wherein the back substrate is provided with a plurality of thin film transistors and a plurality of pixel capacitors, and the electrodes of the pixel capacitors form the pixel electrodes;
each of the plurality of thin film transistors has a gate connected to the scan line; a source connected to the data line; and a drain connected to the pixel electrode.

10. The display device according to claim 9, wherein the pixel includes a red pixel, a green pixel, and a blue pixel; the pixel capacitor includes a first pixel capacitor corresponding to the red pixel, a second pixel capacitor corresponding to the green pixel, and a third pixel capacitor corresponding to the blue pixel.

11. The display device according to claim 10, wherein the pixel further includes a yellow pixel, and the pixel capacitor further includes a fourth pixel capacitor corresponding to the yellow pixel.

12. The display device according to claim 10, wherein the pixel further includes a white pixel, and the pixel capacitor further includes a fifth pixel capacitor corresponding to the white pixel.

13. A liquid crystal display, wherein the liquid crystal display has a plurality of pixels, and the plurality of pixels are distributed at intervals along an array of a plurality of rows and columns; the pixel of a plurality of rows includes a plurality of pixels distributed at intervals on odd rows and a plurality of pixels distributed at intervals on even rows; the brightness of the pixels on the odd rows is disposed differentially from the brightness of the pixels on the even rows, wherein the pixels on the Nth of the odd rows and the pixels on the N+2th of the odd rows are alternately distributed, or—the pixels on the th of the even rows and the pixels on the N+3th of the even rows are alternately distributed, the N being an integer greater than zero.

* * * * *